US012394942B2

(12) United States Patent
Xie

(10) Patent No.: US 12,394,942 B2
(45) Date of Patent: Aug. 19, 2025

(54) CONNECTOR

(71) Applicant: BIZLINK (KUNSHAN) CO., LTD., Kunshan (CN)

(72) Inventor: Jin'an Xie, Kunshan (CN)

( * ) Notice: Subject to any disclaimer, the term of this patent is extended or adjusted under 35 U.S.C. 154(b) by 394 days.

(21) Appl. No.: 18/099,312

(22) Filed: Jan. 20, 2023

(65) Prior Publication Data

US 2023/0246387 A1 Aug. 3, 2023

(30) Foreign Application Priority Data

Jan. 28, 2022 (CN) ......................... 202210104302.8

(51) Int. Cl.

| | |
|---|---|
| ***H01R 13/64*** | (2006.01) |
| ***H01R 13/405*** | (2006.01) |
| ***H01R 13/6471*** | (2011.01) |
| *H01R 13/516* | (2006.01) |

(52) U.S. Cl.

CPC ....... *H01R 13/6471* (2013.01); *H01R 13/405* (2013.01); *H01R 13/516* (2013.01)

(58) Field of Classification Search

CPC ............. H01R 13/6471; H01R 13/405; H01R 13/516; H01R 13/6461; H01R 13/6594; H01R 12/724; H01R 13/6581; H01R 13/6585; H01R 24/60; H01R 13/648

See application file for complete search history.

(56) References Cited

U.S. PATENT DOCUMENTS

| | | | | |
|---|---|---|---|---|
| 5,647,767 A * | 7/1997 | Scheer | H01R 13/719 | 439/620.17 |
| 6,328,603 B1 * | 12/2001 | Chang | H01R 13/6641 | 174/51 |
| 2005/0062556 A1 * | 3/2005 | Aronson | H05K 1/117 | 439/60 |
| 2009/0221165 A1 * | 9/2009 | Buck | H01R 13/6471 | 439/108 |
| 2015/0270661 A1 * | 9/2015 | Kao | H01R 13/6596 | 439/271 |
| 2015/0340798 A1 * | 11/2015 | Kao | H01R 13/516 | 439/660 |
| 2018/0109043 A1 * | 4/2018 | Provencher | H01R 12/737 | |
| 2018/0164519 A1 * | 6/2018 | Takai | G02B 6/4245 | |

(Continued)

FOREIGN PATENT DOCUMENTS

| | | |
|---|---|---|
| CN | 103579861 A | 2/2014 |
| CN | 206595467 U | 10/2017 |

*Primary Examiner* — Truc T Nguyen

(74) *Attorney, Agent, or Firm* — AGMON LAW PTE LTD

(57) ABSTRACT

A connector is provided including a housing and a terminal set. The housing is a conductor and has a connection end and a fixed end. The terminal set includes a plurality of signal terminals and a plurality of grounding terminals. The plurality of grounding terminals includes at least a first grounding terminal. A length of the first grounding terminal is less than 50% of a length of the longest signal terminal, and the first grounding terminal is directly or indirectly electrically connected to a grounding surface to achieve grounding. The grounding terminal is greatly shortened and is not required to pass through the fixed end to be connected to a printed circuit board (PCB), which greatly alleviates the problem of resonance caused by an excessive length of the grounding terminal and improves quality of signal transmission.

7 Claims, 7 Drawing Sheets

(56) References Cited

U.S. PATENT DOCUMENTS

| | | | | |
|---|---|---|---|---|
| 2021/0126402 | A1* | 4/2021 | Zhang | H01R 12/716 |
| 2022/0399663 | A1* | 12/2022 | Chang | H01R 13/6585 |
| 2023/0057194 | A1* | 2/2023 | Wang | H01R 13/6585 |

* cited by examiner

CONNECTOR

CROSS-REFERENCE TO RELATED APPLICATION

This application claims priority to CN application No. 2022101043028, having a filing date of Jan. 28, 2022, the entire contents of which is hereby incorporated by reference.

FIELD OF TECHNOLOGY

The present disclosure relates to the field of electronic devices, and in particular, to a connector.

BACKGROUND

An existing electrical connector comprises a plurality of terminals, wherein electromagnetic interference typically occurs between the terminals. In order to reduce electromagnetic interference, the connector includes a plurality of conductive terminals (hereinafter referred to as terminals) made of metal strip. The plurality of terminals includes a plurality of signal-transmitting terminals and a plurality of grounding terminals. The grounding terminals may extend along with the signal-transmitting terminals and be soldered on a pad of a printed circuit board (PCB) for signal transmitting and grounding. In order to improve shielding of high-frequency noise, in some connector designs, a metal shell of a connector is punched to form one or more conductor pins that are one piece formed with the metal shell. The conductor pins may be bended inwardly and electrically connected to the foregoing grounding terminals to improve grounding efficiency by adding grounding contacts, thereby further reducing the electromagnetic interference.

However, as a transmission rate continuously increases, a signal frequency used by a signal cable is also becoming higher and higher. The foregoing design is insufficient to deal with serious ground loop resonance and crosstalk problem caused by a frequency above 10 GHz. As a result, signal quality and transmitting bandwidth of cable cannot be further improved. On the other hand, taking the foregoing design as an example, cutting the housing is needed, and the housing is required to be specially made, and the overall design of the connector is required to be adjusted accordingly, which lacks applicability and cannot be applied to various connectors.

Accordingly, the problem to be solved by the present disclosure is how to propose a design that can be widely used in various connectors and can fundamentally solve the problem of ground loop resonance and crosstalk of high-frequency signals above 10 GHz on the premise of not making too many adjustments to housings of the existing various connectors.

SUMMARY

An aspect relates to an improved connector, so as to overcome the defects in the conventional art.

The applicant has found that one of the key factors for the problem of ground loop resonance and crosstalk of high-frequency signals in a connector above 10 GHz is lengths of grounding terminals in the connector. The longer the grounding terminal is, the more serious the resonance and crosstalk problem is. Therefore, the core of the present disclosure is to shorten (cut short/use a shorter one) the lengths of some or all of the grounding terminals in the connector, which can effectively and fundamentally alleviate the problem of ground loop resonance and crosstalk of the high-frequency signals in the connector above 10 GHz.

In a first aspect of the present disclosure, a connector is provided, comprising a housing and a terminal set, the housing being a conductor and having a connection end and a fixed end, the terminal set comprising a plurality of signal terminals and at least one grounding terminal, wherein the at least one grounding terminal comprises at least a first grounding terminal, a length of the first grounding terminal being less than 50% of a length of the longest signal terminal, and the first grounding terminal being directly or indirectly electrically connected to a ground surface to achieve grounding.

In some embodiments, the grounding surface is a surface of the housing.

In a specific implementation, the first grounding terminal passes through the housing and is electrically connected to the housing.

In some embodiments, a plurality of grounding terminals are provided, the plurality of grounding terminals comprising at least a second grounding terminal, a length of the second grounding terminal being less than 50% of the length of the longest signal terminal, and the second grounding terminal being directly or indirectly electrically connected to another grounding surface to achieve grounding.

In a specific implementation, the connector further comprises a partition plate, the partition plate being a conductor, the terminal set is distributed on upper and lower sides of the partition plate to form two rows, and the another ground surface is a surface of the partition plate.

In a second aspect of the present disclosure, a connector is provided, comprising a housing and a terminal set, the housing being a conductor and having a connection end and a fixed end, the terminal set comprising a plurality of signal terminals and at least one grounding terminal, wherein one end of each of the plurality of the signal terminal is exposed from the connection end, and the other end of each of the plurality of signal terminal extends out from the fixed end; one end of the grounding terminal is exposed from the connection end, and the other end of the grounding terminal does not protrude from the fixed end, wherein the grounding terminal is electrically connected to the housing.

In some embodiments, a length of the grounding terminal is less than 50% of a length of the longest signal terminal.

In some embodiments, each of the signal terminals comprises at least two bending portions.

In some embodiments, the connector further comprises a partition plate, the partition plate is a conductor, the terminal set is distributed on upper and lower sides of the partition plate to form two rows, and a plurality of grounding terminals are provided, wherein at least one of the grounding terminals is electrically connected to the partition plate.

In some embodiments, the partition plate is electrically connected to the housing.

According to the connector of the present disclosure, the grounding terminal is cut short significantly and is electrically connected to the housing to realize nearby grounding, and the grounding terminal is not required to pass through the fixed end to be connected to a PCB, which greatly alleviates the problem of resonance caused by an excessive length of the grounding terminal, effectively alleviates the problem of ground loop resonance and crosstalk of high-frequency signals in the connector, and improves the quality of transmission of the high-frequency signals.

BRIEF DESCRIPTION

Some of the embodiments will be described in detail, with references to the following Figures.

REFERENCE NUMBERS

Figure 1:
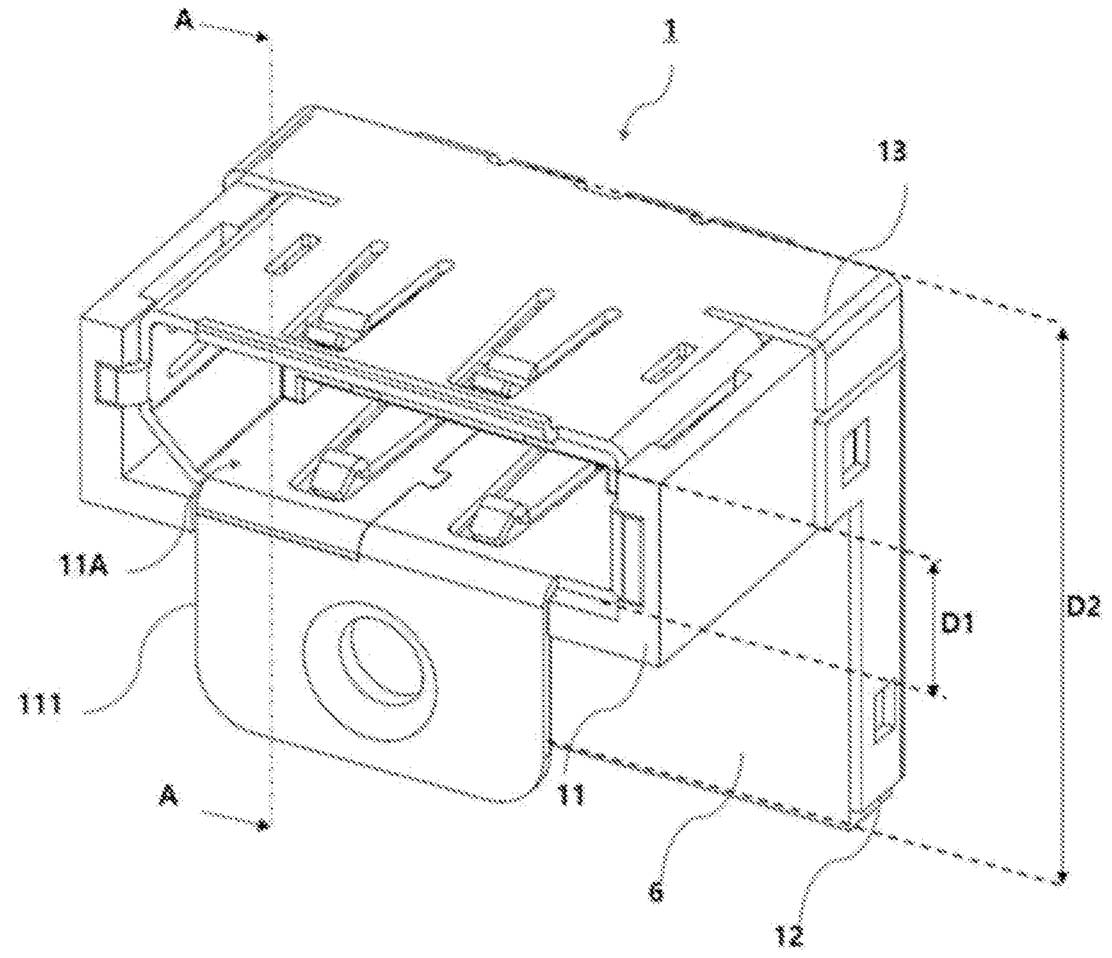
FIG. 1 is a schematic diagram of a three-dimensional structure of a connector according to an embodiment of the present disclosure.

1—housing; 11—connection end; 11A—connection opening; 12—fixed end; 13—main body; 2—insulating base; 21—upper plate; 22—lower plate; 3—partition plate; 4—signal terminal; 4*a*—head; 4*b*—body; 4*c*—tail; 5—grounding terminal; 51—first grounding terminal; 51*a*—head; 51*b*—tail; 52—second grounding terminal; 52*a*—head; 52*b*—tail; 6—protective layer; B—circuit carrier.

DETAILED DESCRIPTION

The applicant has found that the core of the problem of ground loop resonance and crosstalk of high-frequency signals in a connector above 10 GHz is lengths of grounding terminals in the connector. The longer the grounding terminal is, the more serious the resonance and crosstalk problem is. Therefore, one of the cores of the present disclosure is to shorten (cut short or use a shorter one) the lengths of some or all of the grounding terminals in the connector, which can effectively and fundamentally alleviate the problem of ground loop resonance and crosstalk of the high-frequency signals in the connector above 10 GHz. In the following, a specific embodiment may be selected from various feasible designs of the present disclosure for further elaboration.

Firstly, it should be emphasized that, although the present application has a better effect when applied to signal at frequency above 10 GHz, the design can still be applied to connectors corresponding to frequency less than 10 GHz. The present disclosure does not impose any restriction on the frequency of the connector. In addition, three-dimensional auxiliary drawings in the present application are all outputted in parallel projection according to three-dimensional engineering drawings of an actual product, so proportions of elements in the three-dimensional auxiliary drawings are real accurate values. Size ratios measured from the elements in FIG. 1 and FIG. 2 and relationships between the elements are part of the disclosed content of the present application.

Referring to a connector shown in FIG. 1 to FIG. 9, in the present example, the connector is a high-frequency and high-speed connector at a transmission frequency higher than 10 GHz. More specifically, the connector is female or board-end connector of a display port (DP) that conforms to the 2019 displayport 2.0 specification, whose shape and size are specified in the standard, details therefore are not described. It should be emphasized that the connector of the present disclosure is not limited to the foregoing product, but the present disclosure can be freely transferred to any connector with similar requirements when necessary. In addition, the connector is not limited to the board-end connector, and the similar design of the present disclosure can also be applied to wire-end connector when necessary.

In the present example, the connector mainly includes a conductor housing 1 (or housing 1 for short), an insulating base 2, a partition plate 3, and a terminal set (mainly including a plurality of signal terminals 4 and grounding terminals 5). Other elements such as latches not directly related to the problem to be solved in the present application will be omitted.

In the present example, the conductor housing 1 is formed by bending and punching a single conductive metal plate, that is, one piece formed. However, the housing may also be formed by a combination of a plurality of conductive or non-conductive elements when necessary.

Figure 2:
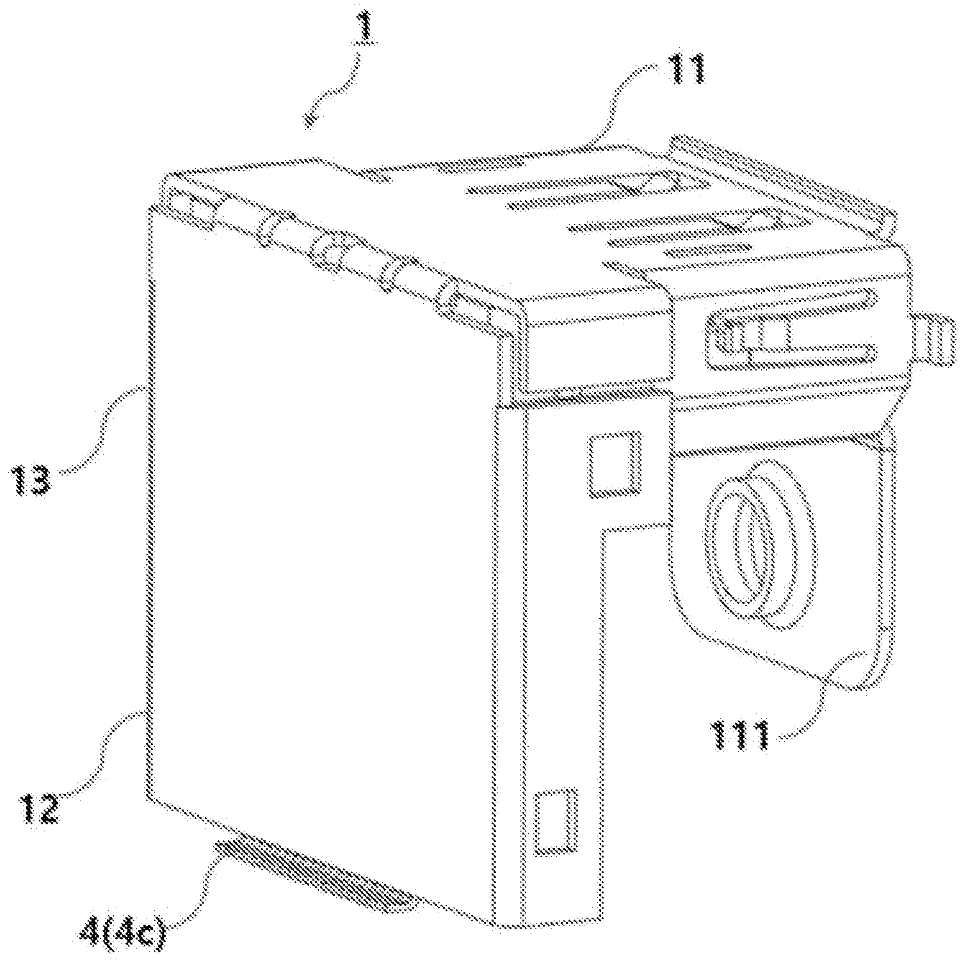
FIG. 2 is another schematic diagram of a three-dimensional structure of a connector according to an embodiment of the present disclosure.
Figure 3:
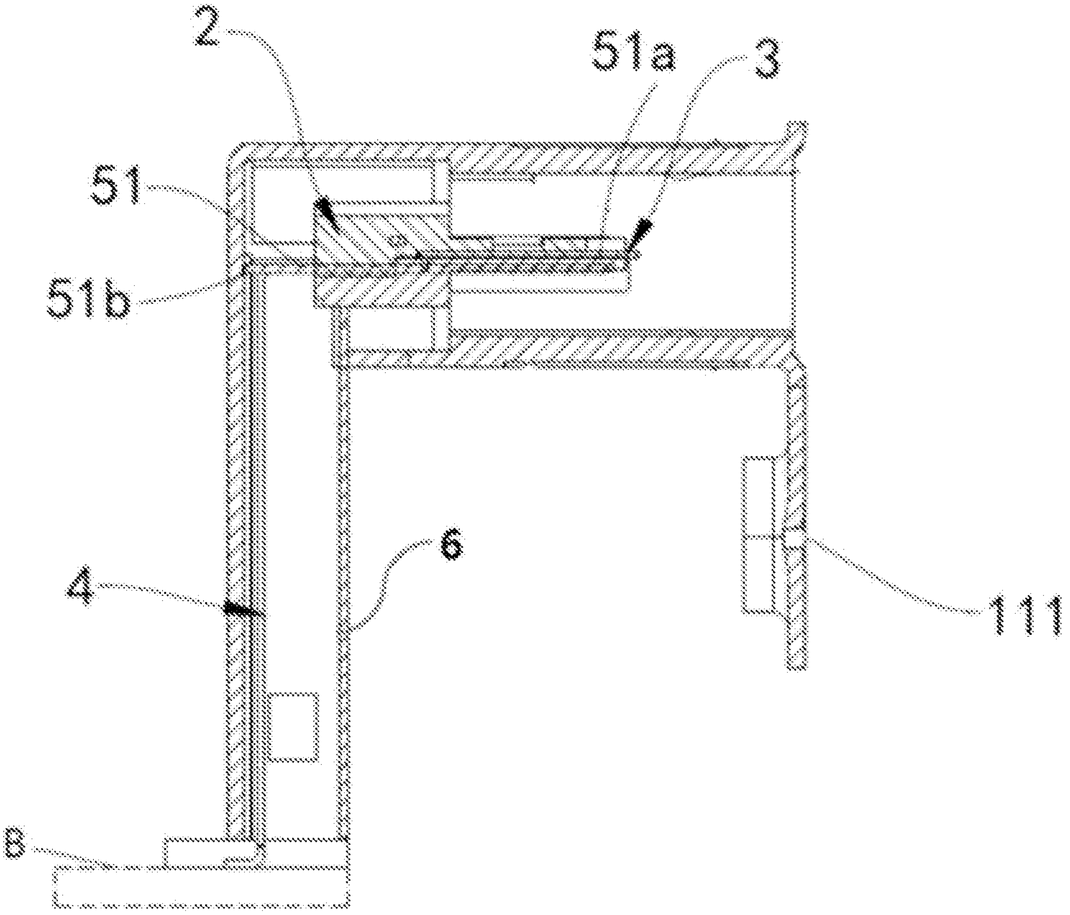
FIG. 3 is a section-view along A-A direction in FIG. 1.
Figure 4:
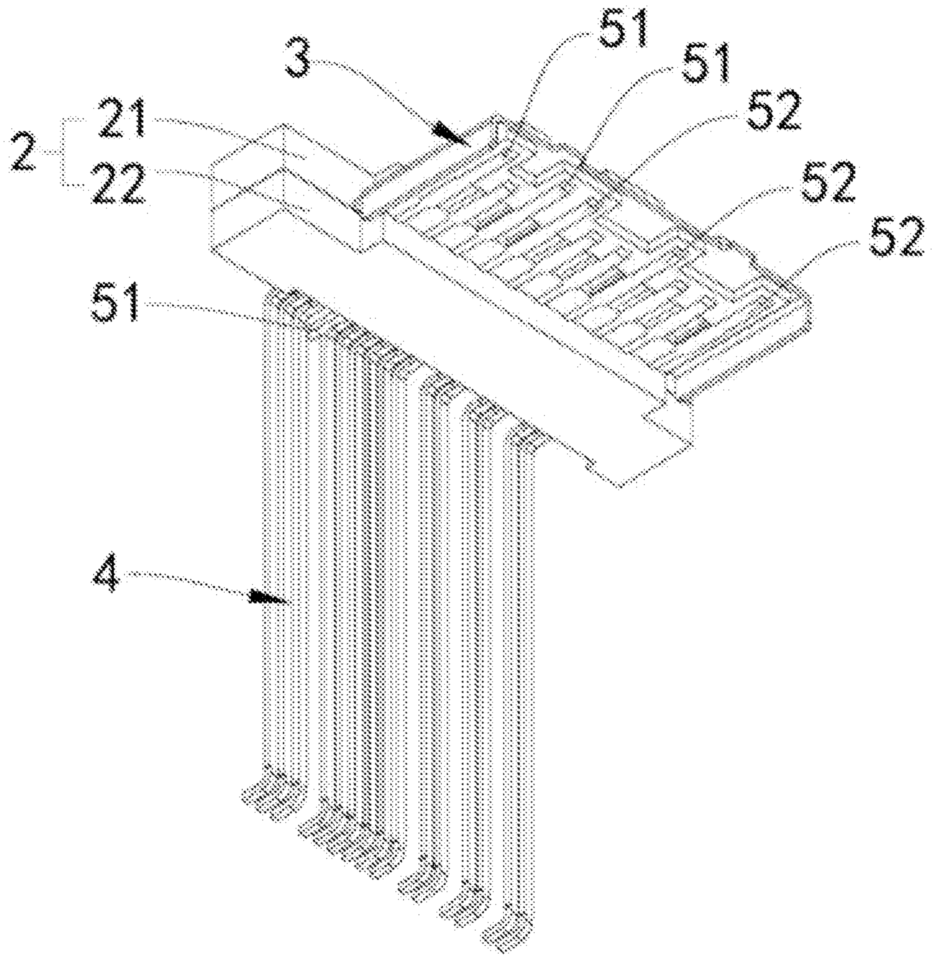
FIG. 4 is a schematic diagram of a three-dimensional structure of a connector according to an embodiment of the present disclosure, wherein the housing is not shown.
Figure 5:
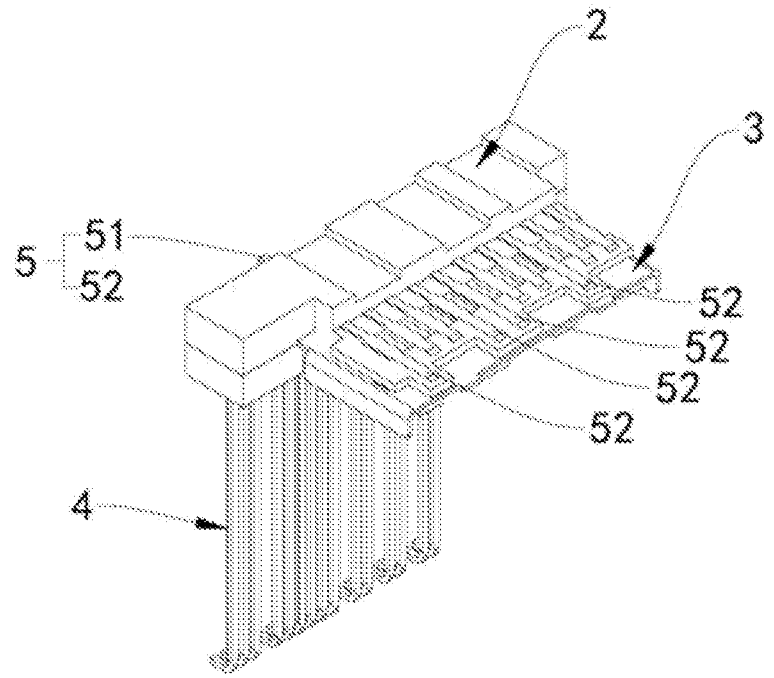
FIG. 5 is another schematic diagram of a three-dimensional structure of a connector according to an embodiment of the present disclosure, wherein the housing is not shown.
Figure 6:
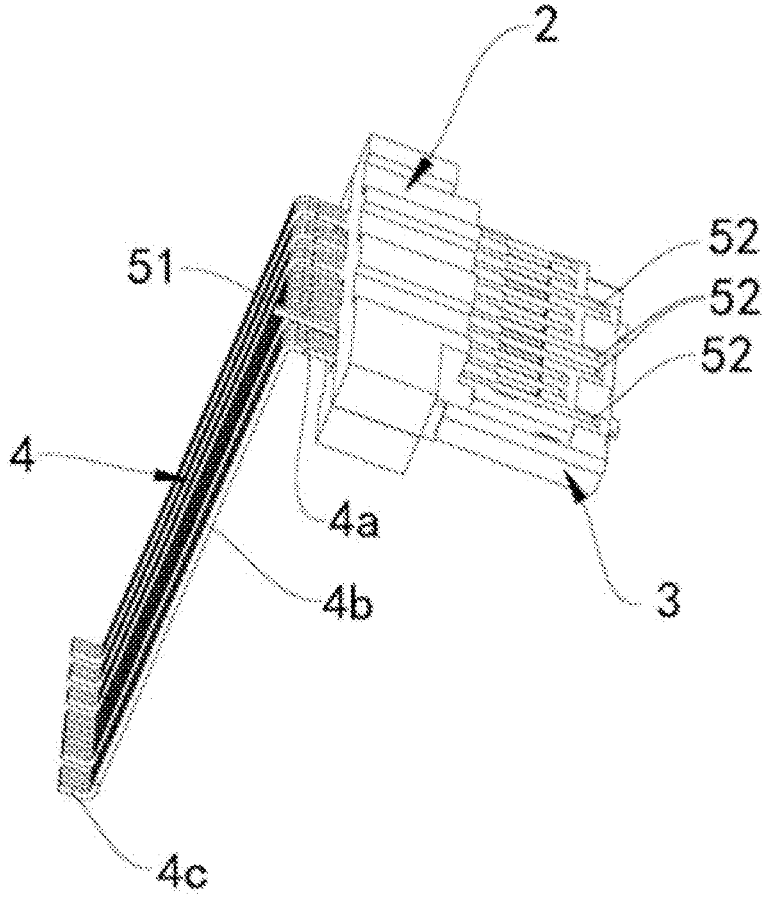
FIG. 6 is yet another schematic diagram of a three-dimensional structure of a connector according to an embodiment of the present disclosure, wherein the housing is not shown.

As shown in FIG. 1 and FIG. 2, in terms of functions, the housing 1 of the connector may be roughly divided into a connection end 11, a fixed end 12, and a main body 13. The connection end 11 is configured to be connected to another connector. The fixed end 12 is configured to allow the terminal set in the housing 1 to extend out to be electrically connected to a soldering pad soldered on a circuit carrier B (e.g., a PCB). The main body 13 is configured to be connected to the connection end 11 and the fixed end 12 and maintain positions of the two. In addition, taking FIG. 1 and FIG. 2 as an example, the connection end 11 is located at an upper end of the connector, the fixed end 12 is located at a lower end of the connector, and the connection end 11 is provided with a connection opening 11A to allow an external wire-end connector to be inserted therein. In addition, the housing 1 may include a protective layer 6 on its inner side. The protective layer 6 may be formed by pouring plastics into the inner side of the housing 1 and curing; or blocks the terminal set therein from the outside by using a plastic plate.

In addition, as shown in FIG. 1, when the terminal set of the connector is soldered to the external circuit carrier B, a maximum distance between any two points on the entire housing 1 along a normal vector direction (hereinafter referred to as a vertical direction) of an operating surface of the circuit carrier B is the maximum height D2 of the connector. At the same time, a maximum distance between any two points on an inner end surface of the connection opening 11A of the connection end 11 of the connector along the foregoing vertical direction is the maximum height D1 of the connection end 11. The maximum height D2 of the connector is 3 times or more than the maximum height D1 of the connection end 11. Moreover, a hole plate 111 extends vertically downwards from a tail end of the connection opening 11A of the connection end 11, and a screw hole is provided in the center of the hole plate 111, allowing fixation with another external element via a screw.

Figure 7:
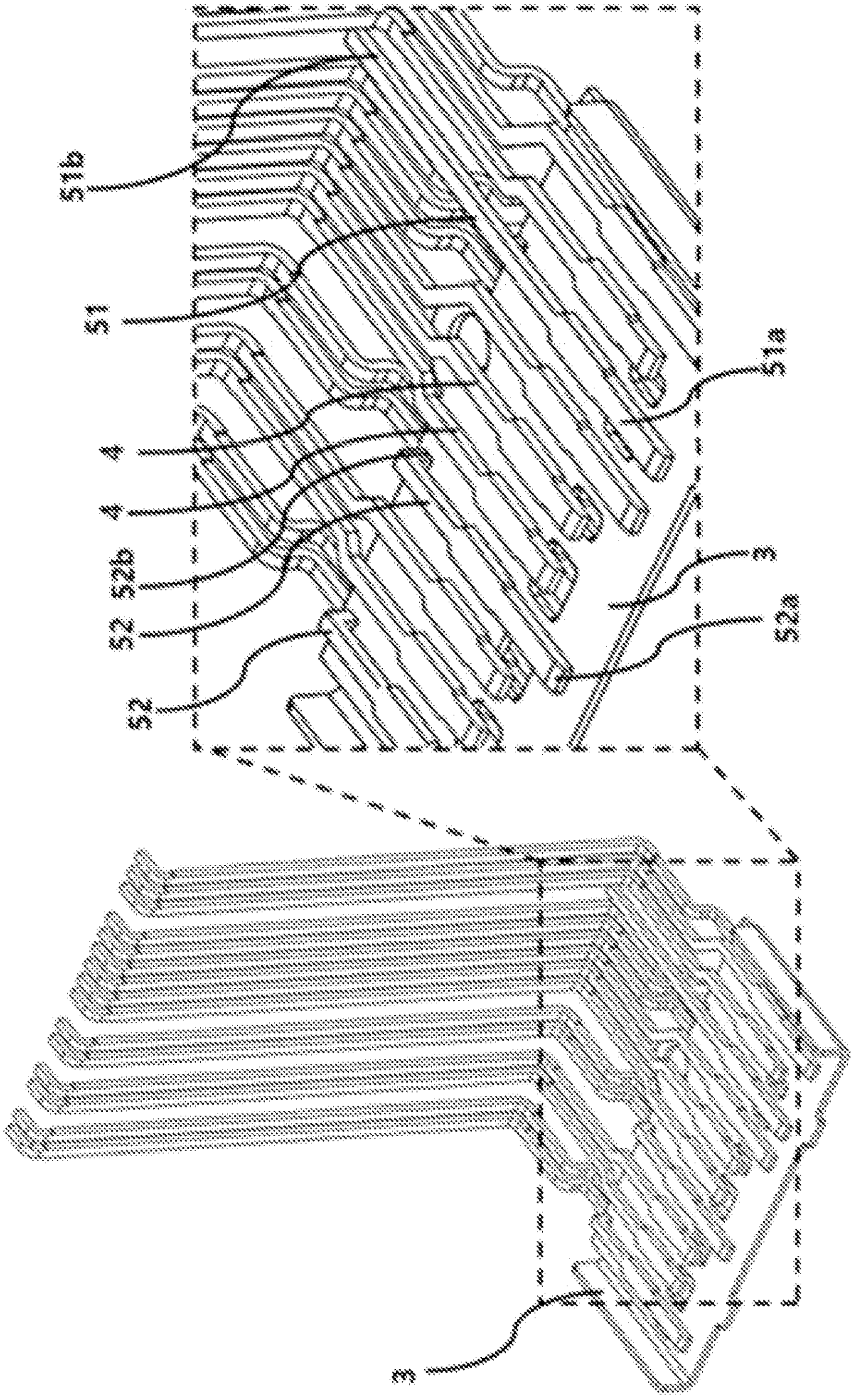
FIG. 7 is a schematic diagram of the three-dimensional structure shown in FIG. 6, wherein the insulating base is not shown.
Figure 8:
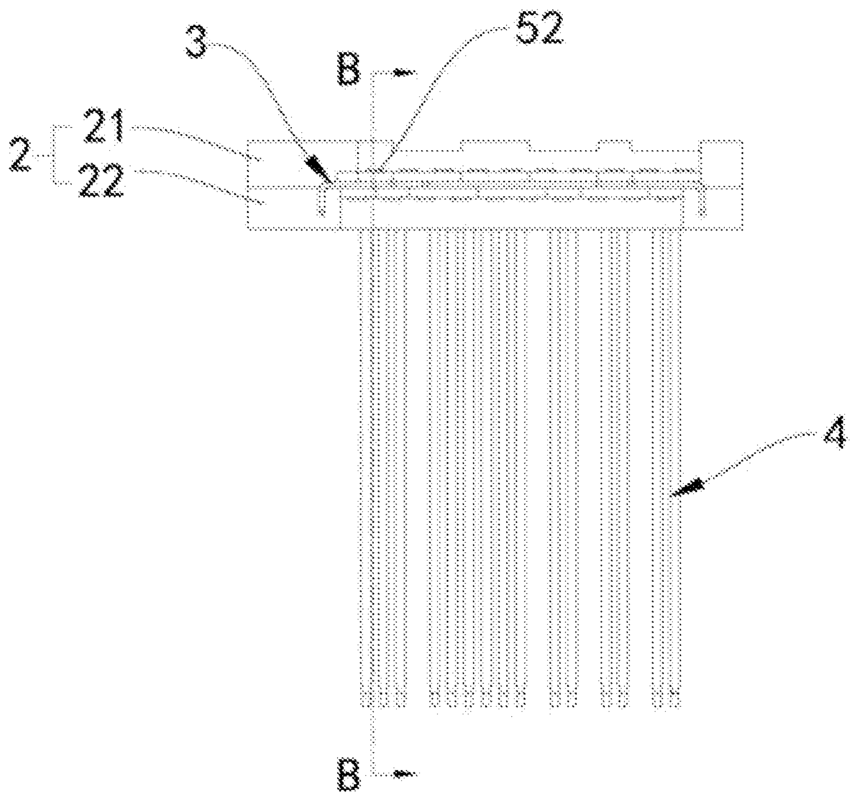
FIG. 8 is a side view of the structure shown in FIG. 6.
Figure 9:
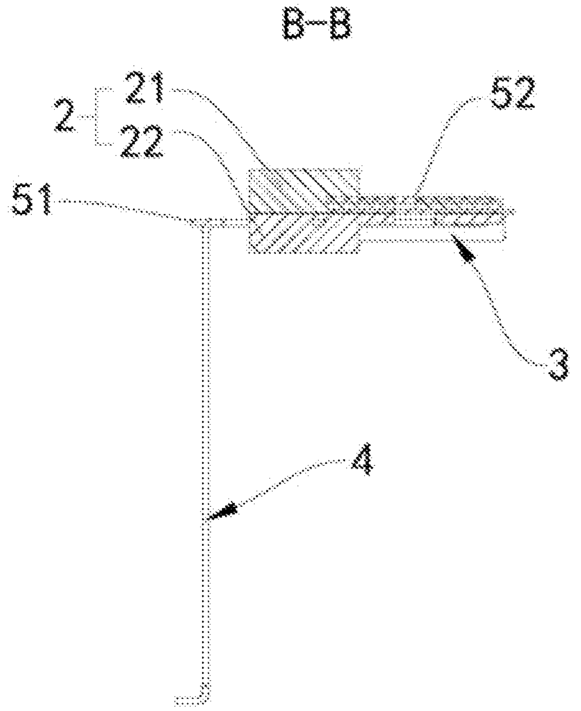
FIG. 9 is a section view along B-B direction in FIG. 8.

The terminal set is a general term for a plurality of terminals. Referring to FIG. 7, in the present example, the so-called terminal is, for example, a long thin sheet-like conductor (such as metal) element for conducting signals or electric energy. In addition, when necessary, the terminal may also refer to a comb-shaped conductor structure including a plurality of connection ends communicated at the bottom and protrudes outwards, which is not limited in the present disclosure. In terms of functions, the terminal set specifically includes a plurality of signal terminals 4 for transmitting signals and a plurality of grounding terminals 5 for grounding. In the present example, as shown in FIG. 7, each of the signal terminals 4 may be divided into three major parts: a head 4*a*, a body 4*b*, and a tail 4*c*. The body 4*b* extends approximately along a vertical direction, while the head 4*a* and the tail 4*c* extend laterally from upper and lower ends of the body 4*b* in different directions respectively. That is, each of the signal terminals 4 includes two bending portions, which are respectively formed at a junction of the head 4*a* and the body 4*b* and a junction of the body 4*b* and the tail 4*c*, so that a lateral profile of the signal terminal is roughly Z-shaped. In the terminal set, each signal terminal pair formed by two signal terminals 4 is separated by two grounding terminals 5 for grounding to prevent mutual interference between each signal pair. A length of the head 4*a* of the signal terminal 4 may be more than four times that of the tail 4*c* of the signal terminal 4. In the present example, a height of the body 4*b* along the vertical direction is about 2 to 3 times the length of the head 4*a* but the present disclosure is not limited thereto. When necessary, the shape of each terminal may be adjusted as required.

In addition, the insulating base 2 may be made by an injection molding process and one piece formed, with a front end including an upper plate 21 and a lower plate 22 extending forward. The upper plate 21 and the lower plate 22 respectively include a plurality of slots facing up and down. According to different designs, a relationship between the insulating base 2 and the terminal set may be divided into two types: pre-mounting and later-mounting. "Pre-mounting" means that the insulating base 2 is directly formed on each terminal by an insert molding process in injection molding. "Later-mounting" means that the insulating base 2 is molded first, and then the terminal set is inserted therein. In the present example, by means of pre-mounting, stability of each signal terminal 4 is optimized and the quality of signal transmission is improved.

If the molded insulating base 2 is separated from each terminal, it may be seen that the upper plate 21 and the lower plate 22 respectively include a plurality of channels passing through front and rear ends of the insulating base 2 and communicated with the slots, and the channels are communicated with the slots of the upper plate 21 and the lower plate 22 respectively. With the design, the front ends of the terminals can be exposed through the slots of the upper plate 21 and the lower plate 22 respectively. The upper plate 21 and the lower plate 22 are configured to fix positions of the terminals and isolate the signal terminals 4 placed therein from each other. In the present disclosure, "A is exposed from/through/with respect to B" is defined as that A is not completely covered by B.

In the present example, the partition plate 3 is made of a metal plate that is one piece formed, with a flat middle part and two sides bending inwardly to form vertical walls. The partition plate 3 is configured to isolate electromagnetic waves emitted by the signal terminals placed in the upper plate 21 and the lower plate 22 from interfering with each other.

In the present example, the partition plate 3 is formed between the upper plate 21 and the lower plate 22 of the insulating base 2. In fact, the partition plate 3 may be mounted first or mounted later. "Mounted first" means that the insulating base 2 is directly formed on the partition plate 3 by insert molding, so that the two can be fixed to each other. "Mounted later" means that, when the insulating base 2 is formed, firstly, a gap is reserved between the upper plate 21 and the lower plate 22, and then the partition plate 3 is inserted from a front end of the gap when assembled so as to be fixed between the upper plate 21 and the lower plate 22. In the present example, the design of "mounted first" is adopted.

One end of the head 4*a* of the signal terminal 4 is exposed from the connection end 11, so as to be connected to an external connector. One end of the tail 4*c* of the signal terminal 4 extends out from the fixed end 12, thereby enabling electrical connection with another element (such as a PCB). The plurality of grounding terminals 5 include at least a first grounding terminal 51 and at least one second grounding terminal 52. When a length of the first grounding terminal 51 is less than 50%, 35%, or 20% of a length of the longest signal terminal 4, the effect becomes better, and the first grounding terminal 51 is directly or indirectly electrically connected to a grounding surface to achieve grounding. The grounding surface here may be, for example, either of the housing 1 and the partition plate 3. More specifically, as can be seen from FIG. 3 and FIG. 4, the first grounding terminal 51 has a front end exposed from a slot in either of the upper plate 21 and the lower plate 22 and the other end not bending and extending horizontally until it contacts an inner surface of the housing 1 and is electrically connected to ground. In some other embodiments, the first grounding terminal 51 may be further configured to pass through the housing 1 and be electrically connected to the housing 1 so as to achieve grounding.

As can be seen from FIG. 7, the tail 4*c* of the signal terminal 4 extends out from the fixed end 12 and is electrically connected to the circuit carrier B board, but the first grounding terminal 51 and the second grounding terminal 52 have been cut short and grounded with the housing 1 or the partition plate 3, which will not protrude from the housing 1. Heads 51*a* and 52*a* of the first grounding terminal 51 and the second grounding terminal 52 may still be exposed from the connection end 11 to be electrically connected to the grounding terminal or pad of the external connector.

All signal terminals 4 and grounding terminals 5 are mounted in the insulating base, and all signal terminals 4 and grounding terminals 5 are distributed on upper and lower sides of the partition plate 3 to form two rows. The so-called "A extends out from B" in the present application means that at least part of A extends from the inside of B to the outside. For example, if the first grounding terminal 51 passes through and extends out of the housing 1, the first grounding terminal 51 extends out from the housing 1.

In addition, when a length of the second grounding terminal 52 is also less than 50%, 35%, or 20% of the length of the longest signal terminal 4, the effect becomes better, and the second grounding terminal 52 is directly or indirectly electrically connected to a grounding surface to achieve grounding. Herein specifically, the other grounding surface is a surface of the partition plate 3. As can be seen from FIG. 7, in the design, the tail 52*b* of each second grounding terminal 52 penetrates through the upper plate 21 or the lower plate 22 via a through hole (not shown) on the upper plate 21 or the lower plate 22 to be electrically connected to each surface of the partition plate 3 to achieve a grounding effect. At the same time, the first grounding terminal 51 is also communicated with the partition plate 3 so that the partition plate 3 is grounded and communicated with the housing 1. The first grounding terminal 51 is communicated with the partition plate 3, for example, by bending the first grounding terminal 51 to make it contact the partition plate 3; or through an electrical connection element such as solder, or as shown in FIG. 7, by bending or stamping the partition plate 3 to form a bump on its surface, so as to be electrically connected to the first grounding terminal 51. Alternatively, the partition plate 3 may be conducted with the housing 1 through another element, or directly contact the housing 1 for conduction, which is not limited in the present disclosure. In addition to the first grounding terminal 51 and the second grounding terminal 52 whose tails do not extend out from the housing 1, the grounding terminal 5 may also include a third grounding terminal (not marked) that individually extends out from the housing 1 and is electrically connected to the circuit carrier B. In brief, in the present application, each grounding terminal 5 in the connector can adopt any one of the following three or other feasible grounding designs. In a first design, the grounding terminal 5 is cut short and then grounded with the housing 1. In a second design, the grounding terminal 5 is cut short and then grounded with the partition plate 3. In a third design, the grounding terminal 5 is not cut short, but extends along the signal terminal 4 and is grounded with the circuit carrier B.

In some other embodiments, all the grounding terminals 5 may be electrically connected to the housing 1 to achieve grounding; or all the grounding terminals 5 may be electrically connected to the partition plate 3 to achieve grounding. In some other embodiments, the partition plate 3 may be electrically connected to the housing 1, so that the grounding terminal 5 is indirectly electrically connected to the housing 1.

In brief, according to the connector of the present disclosure, the grounding terminal 5 is cut short significantly and is electrically connected to the housing 1 or electrically connected to the partition plate 3 to realize nearby grounding, and the grounding terminal 5 is not required to pass through the fixed end 12 as a whole to be connected to the circuit carrier B, which greatly alleviates the problem of resonance caused by an excessive length of the grounding terminal 5 and improves the quality of signal transmission.

Although the present disclosure has been disclosed in the form of embodiments and variations thereon, it will be understood that numerous additional modifications and variations could be made thereto without departing from the scope of the disclosure. For the sake of clarity, it is to be understood that the use of 'a' or 'an' throughout this application does not exclude a plurality, and 'comprising' does not exclude other elements.

What is claimed is:

1. A connector, comprising:

a housing, being a conductor and having a connection end and a fixed end, a terminal set, comprising a plurality of signal terminals and at least one grounding terminal;

wherein the at least one grounding terminal comprises at least a first grounding terminal, a length of the first grounding terminal is less than 50% of a length of the longest signal terminal, and the first grounding terminal is directly or indirectly electrically connected to a grounding surface to achieve grounding;

wherein the at least one grounding terminal further comprises at least a second grounding terminal, a length of the second grounding terminal is less than 50% of the length of the longest signal terminal, and the second grounding terminal is directly or indirectly electrically connected another grounding surface to achieve grounding; and a partition plate, being a conductor, the terminal set being distributed on upper and lower sides of the partition plate to form two rows, and said another grounding surface being a surface of the partition plate.

2. The connector according to claim 1, wherein the grounding surface is a surface of the housing.

3. The connector according to claim 2, wherein the first grounding terminal passes through the housing and is electrically connected to the housing.

4. The connector according to claim 1, wherein the partition plate is electrically connected to the housing.

5. A connector, comprising:

a housing, being a conductor and having a connection end and a fixed end;

a terminal set, comprising a plurality of signal terminals and at least one grounding terminal;

wherein one end of each of the plurality of signal terminals is exposed from the connection end, and the other end of each of the plurality of signal terminals extends out from the fixed end; one end of the grounding terminal is exposed from the connection end, and the other end of the grounding terminal does not extend out from the fixed end;

wherein the grounding terminal is electrically connected to the housing; and a partition plate, being a conductor, the terminal set being distributed on upper and lower sides of the partition plate to form two rows, the at least one grounding terminal is electrically connected to the partition plate, and the partition plate is electrically connected to the housing.

6. The connector according to claim 5, wherein a length of the grounding terminal is less than 50% of a length of the longest signal terminal.

7. The connector according to claim 5, wherein each of the signal terminals comprises at least two bending portions.

* * * * *